(12) United States Patent
Copp et al.

(10) Patent No.: US 7,900,894 B2
(45) Date of Patent: *Mar. 8, 2011

(54) LOAD CONTROL POWER TRANSMISSION

(75) Inventors: Bruce A. Copp, Burnsville, MN (US); Gary L. Veikley, Inver Grove Heights, MN (US); Ryan M. Stanoch, Oakdale, MN (US)

(73) Assignee: Hydralift AmClyde, Inc., St. Paul, MN (US)

( * ) Notice: Subject to any disclaimer, the term of this patent is extended or adjusted under 35 U.S.C. 154(b) by 114 days.

This patent is subject to a terminal disclaimer.

(21) Appl. No.: 12/358,922

(22) Filed: Jan. 23, 2009

(65) Prior Publication Data
US 2009/0127528 A1 May 21, 2009

Related U.S. Application Data

(63) Continuation of application No. 11/040,278, filed on Jan. 20, 2005, now Pat. No. 7,487,954.

(60) Provisional application No. 60/540,105, filed on Jan. 28, 2004.

(51) Int. Cl.
*B66D 1/14* (2006.01)
(52) U.S. Cl. .................... 254/348; 254/365
(58) Field of Classification Search .......... 254/348, 254/365, 349, 367; 192/70.12, 113.31
See application file for complete search history.

(56) References Cited

U.S. PATENT DOCUMENTS

| | | |
|---|---|---|
| 3,697,049 A | 10/1972 | Wallace |
| 3,738,614 A | 6/1973 | Peterson |
| 3,801,071 A | 4/1974 | Barron |
| 3,811,657 A | 5/1974 | Hoover |
| 3,971,545 A | 7/1976 | Warman |
| 4,034,963 A | 7/1977 | Warman et al. |
| 4,324,387 A | 4/1982 | Steinhagen |
| 4,404,891 A | 9/1983 | Turnquist et al. |
| 4,434,971 A | 3/1984 | Cordrey |
| 4,556,199 A | 12/1985 | Dansie et al. |
| 4,615,418 A | 10/1986 | Atwell |
| 4,751,990 A | 6/1988 | Schraut et al. |

(Continued)

FOREIGN PATENT DOCUMENTS

EP 0144527 6/1985

(Continued)

OTHER PUBLICATIONS

Australian Search Report, Application No. SG 200604024-0, 6 pages, Jul. 25, 2007.

(Continued)

*Primary Examiner* — Emmanuel M Marcelo
(74) *Attorney, Agent, or Firm* — Dorsey & Whitney LLP; Stuart R. Hemphill, Esq.

(57) ABSTRACT

The present invention is a transmission used with a winch drum. The transmission includes a drive shaft, an output shaft, a hydraulic or pneumatic system, a cooling system, a gear coaxially mounted on the output shaft, and an electric motor for powering the gear. The drive shaft is adapted to drive the winch drum and includes a clutch disc extending generally radially outwards from the drive shaft. The clutch disc has a face. The output shaft coaxially surrounds at least a portion of the drive shaft and includes a friction surface extending generally radially inward. The friction surface has a face opposing the face of the clutch disc. The hydraulic or pneumatic system is adapted to bring the faces into contact, and the cooling system is adapted to remove heat from the friction surface via a fluid coolant.

14 Claims, 10 Drawing Sheets

U.S. PATENT DOCUMENTS

| | | |
|---|---|---|
| 4,977,991 A | 12/1990 | Mahoney |
| 5,613,588 A | 3/1997 | Vu |
| 6,076,646 A | 6/2000 | Burns |
| 6,305,515 B1 | 10/2001 | Heidenreich et al. |
| 6,347,695 B1 | 2/2002 | Kuhn et al. |
| 6,405,837 B1 | 6/2002 | Muramoto |
| 6,533,095 B2 | 3/2003 | Mohan et al. |
| 6,578,685 B2 | 6/2003 | Porter |
| 6,585,095 B2 | 7/2003 | Savoyard et al. |
| 7,261,195 B2 | 8/2007 | Burns et al. |
| 7,487,954 B2 | 2/2009 | Copp et al. |
| 2005/0133774 A1 | 6/2005 | Long |

FOREIGN PATENT DOCUMENTS

| | | |
|---|---|---|
| GB | 1213531 | 11/1970 |
| JP | 2001-173349 | 6/2001 |
| JP | 2002-031217 | 1/2002 |
| JP | 2003-214467 | 7/2003 |
| SU | 1355601 | 11/1987 |

OTHER PUBLICATIONS

Australian Written Opinion, Application No. SG 200604024-0, 7 pages, Jul. 25, 2007.

Brochure: "Introducing the Exclusive AMPAC 2000 (AmClyde Multiple Purpose Adjustable Clutch) Drive System", AmClyde Engineered Products, Inc., Offshore Technology.

Conference, 2 pages, at least as early as May 1997.

US 7,900,894 B2

LOAD CONTROL POWER TRANSMISSION

CROSS-REFERENCE TO RELATED APPLICATIONS

This application is a Continuation of U.S. patent application Ser. No. 11/040,278, filed on Jan. 20, 2005, issued as U.S. Pat. No. 7,487,954 on Feb. 10, 2009, which claims the benefit of U.S. Provisional Patent Application No. 60/540,105, filed on Jan. 28, 2004, and entitled "Load Control Power Transmission", the disclosure of each of which are hereby incorporated herein by reference in their entireties.

FIELD OF THE INVENTION

The present invention relates to winches. More specifically, the present invention relates to transmissions used with winches that are subject to dynamic loading conditions, such as those conditions that arise in a marine environment.

BACKGROUND OF THE INVENTION

Towing/anchor-handling marine vessels are equipped with winches. When paying out or hauling in wire rope or holding a load stationary, the winches and their wire rope are often subjected to load surges and peaks because of wave action encountered by the vessel. These load surges and peaks can cause the wire rope to fail.

The length of wire rope to be paid out from a winch can be significant. Thus, payout of wire rope at normal winch operating speeds can require substantial amounts of time.

There is a need in the art for an apparatus and method adapted to minimize the effect of load surges and peaks on winches during payout and haul-in operations in a marine environment. Also, there is need in the art for the ability to perform high speed/horsepower dynamic payout of wire rope in a controlled manner.

BRIEF SUMMARY OF THE INVENTION

The present invention, in one embodiment, is a transmission used with a winch drum. The transmission includes a fluid cooled clutch coaxially mounted on a drive shaft adapted to drive the winch drum.

The present invention, in another embodiment, is a transmission used with a winch drum. The transmission includes a drive shaft, an output shaft, a hydraulic or pneumatic system, a cooling system, a gear coaxially mounted on the output shaft, and an electric motor for powering the gear. The drive shaft is adapted to drive the winch drum and includes a clutch disc extending generally radially outwards from the drive shaft. The clutch disc has a face. The output shaft coaxially surrounds at least a portion of the drive shaft and includes a friction surface extending generally radially inward. The friction surface has a face opposing the face of the clutch disc. The hydraulic or pneumatic system is adapted to bring the faces into contact, and the cooling system is adapted to remove heat from the friction surface via a fluid coolant.

The present invention, in another embodiment, is a transmission used with a winch drum. The transmission comprises a drive shaft, an output shaft, an actuation system, and a cooling system. The drive shaft is adapted to drive the winch drum and is operably coupled to a first clutch surface. The output shaft is adapted to be driven by a motor and is operably coupled to a second clutch surface opposing the first clutch surface. The actuation system is adapted to bring the first and second surfaces into contact. The cooling system is adapted to remove heat from at least one of the surfaces via a fluid coolant.

The present invention, in another embodiment, is a method of controlling a winch drum transmission equipped with a drive shaft and an output shaft that coaxially surrounds at least a portion of the drive shaft. The drive shaft is adapted to drive a winch drum, and the output shaft is adapted to transfer power from an electric motor to the drive shaft via a hydraulic or pneumatic clutch. The method includes setting a winch load limit, hydraulically or pneumatically causing the clutch to prevent relative displacement between the drive and output shafts when an actual winch load does not exceed the set winch load limit, allowing relative displacement between the shafts when the actual winch load exceeds the set winch load limit, and circulating a fluid coolant through the clutch to remove heat resulting from the relative displacement between the shafts.

The present invention, in another embodiment, is a method of performing dynamic payout of wire rope from a winch drum coupled to a transmission. The transmission is equipped with a drive shaft and an output shaft. The drive shaft is adapted to drive the winch drum, and the output shaft coaxially surrounds at least a portion of the drive shaft and is adapted to transfer power from an electric motor to the drive shaft via a hydraulic or pneumatic clutch. The electric motor is electrically connected to an electrical load, such as resistor bank, and the clutch is fluidly connected to a cooling system. Dynamic payout of the wire rope generates energy that needs to be dissipated. In one embodiment, the method includes setting a transition point based on a percentage of the electrical load capacity. In another embodiment, the method includes setting a transition point based on a predetermined electric motor speed. For example, in one embodiment, the predetermined electric motor speed may be based on a percentage of the maximum electric motor speed. The method further includes hydraulically or pneumatically causing the clutch to prevent relative displacement between the shafts when the transition point has not been exceeded, thereby causing all of the energy, generally speaking, to be dissipated through the electrical load, and hydraulically or pneumatically actuating the clutch to allow relative displacement between the shafts when the transition point has been exceeded, thereby causing at least a portion of the energy to be dissipated through the cooling system and the remainder of the energy to be dissipated through the electrical load.

The present invention, in another embodiment, is a method of dissipating energy generated by dynamic payout of wire rope from a winch drum. The method includes setting a transition point wherein the responsibility for dissipating the energy transitions from being, generally speaking, the responsibility of a primary energy dissipation system to being shared between the primary system and a supplemental energy dissipation system, dissipating the energy through the primary system when the transition point has not been exceeded, and dissipating the energy through the primary and supplemental systems when the transition point has been exceeded. In one embodiment, the primary system is an electric motor electrically coupled to an electrical load, and the supplemental system is a fluid cooled clutch fluidly coupled to a cooling system. In another embodiment, the primary system is a hydraulic motor fluidly coupled to a hydraulic system, and the supplemental system is a fluid cooled clutch fluidly coupled to a cooling system.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1A:
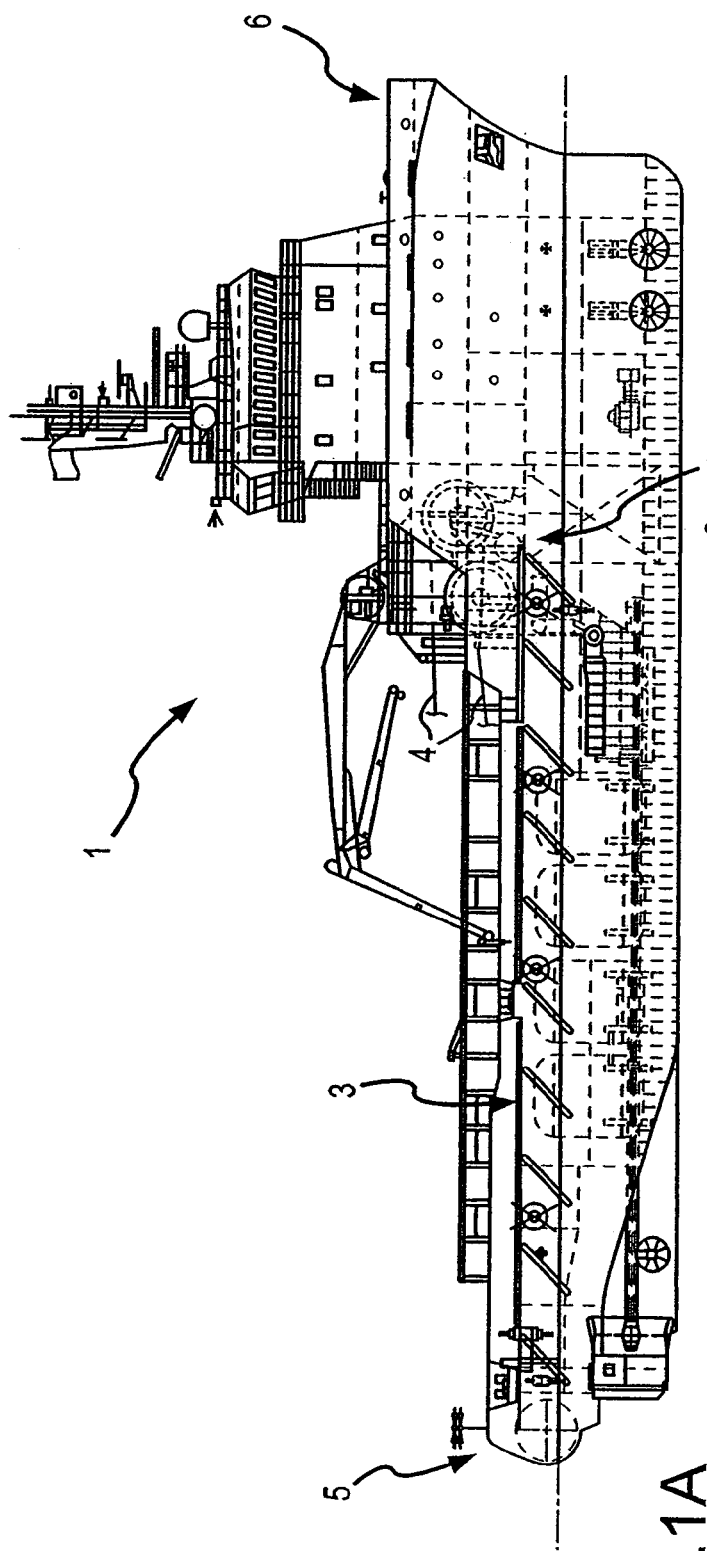
FIG. 1A is a starboard elevation of a marine vessel equipped with an anchor-handling/towing winch system.
Figure 1B:
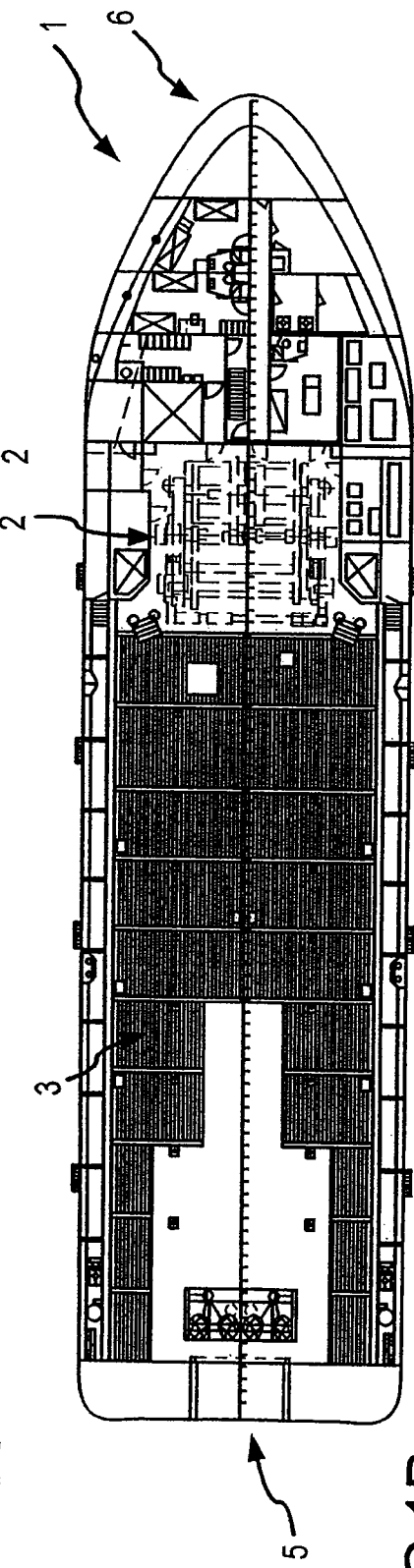
FIG. 1B is a plan view of the marine vessel illustrated in FIG. 1A.

FIGS. 1A and 1B are, respectively, a starboard elevation and a plan view of a marine vessel 1 equipped with the anchor-handling/towing winch system 2 of the subject invention. As illustrated in FIGS. 1A and 1B, in one embodiment, the winch system 2 is mounted on the deck 3 of the marine vessel 1 with the winch system's wire ropes 4 feeding towards the stem 5 of the vessel from the winch system 2. In other embodiments, the winch system 2 is mounted on the deck 3 of a marine vessel 1 so the wire ropes 4 feed towards other parts of the vessel 1, such as the bow 6.

Figure 2:
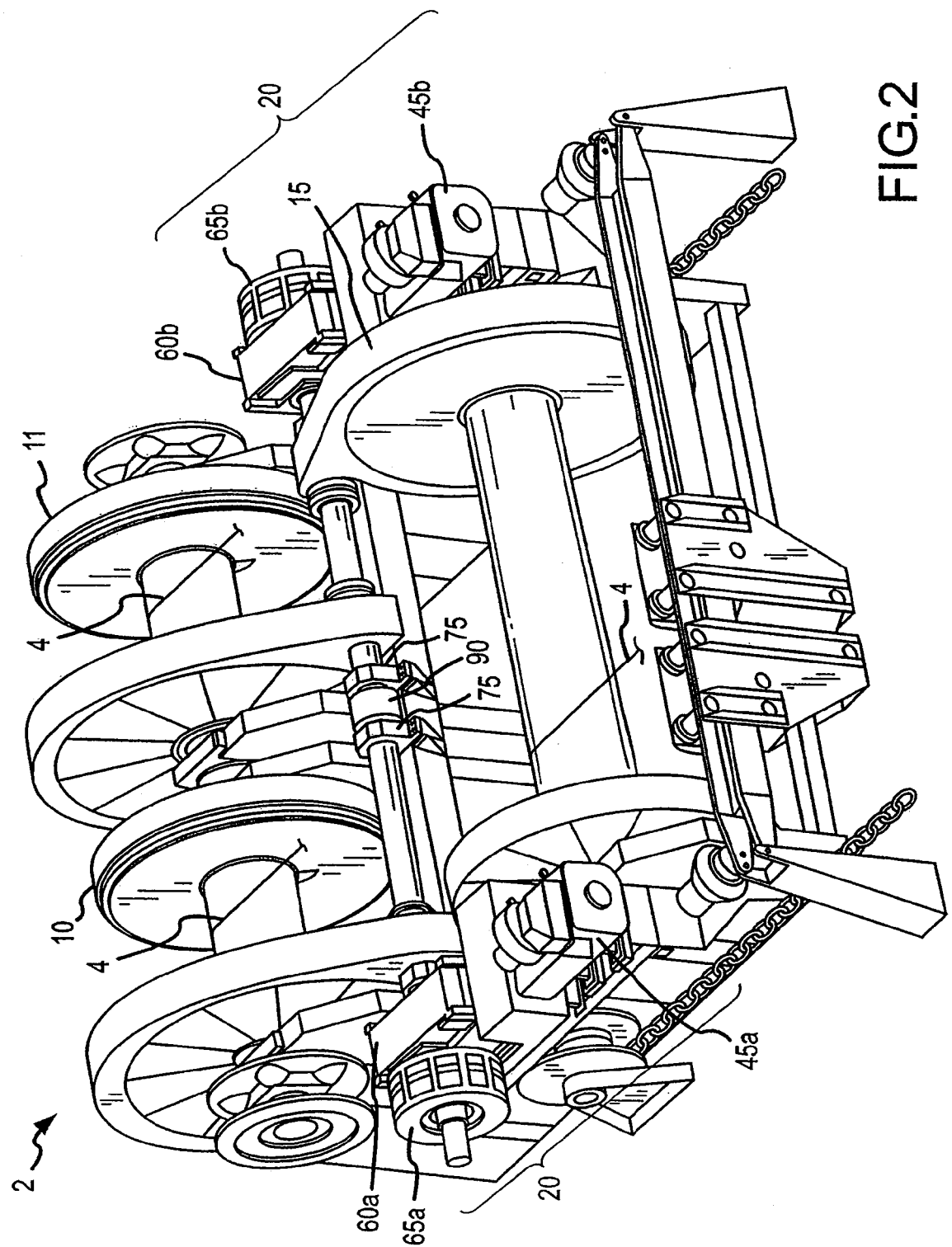
FIG. 2 is an isometric view of the anchor-handling/towing winch system as viewed from an elevated, port/stern position.

FIG. 2 is an isometric view of the anchor-handling/towing winch system 2 as viewed from an elevated, port/stern position. As shown in FIG. 2, in one embodiment, the winch system 2 includes a port tow drum 10, a starboard tow drum 11, an anchor-handling drum 15, and a load control power transmission 20. The drums 10, 11, 15 carry wire rope 4.

The load control power transmission 20 drives and/or brakes the drums 10, 11, 15 during the winch system's various in-hauling and payout operations. As shown in FIG. 2 and explained in the following discussion of FIGS. 3 and 4, in one embodiment, the load control power transmission 20 employs a load limiting clutch 65a, 65b directly on each drive shaft 70a, 70b to eliminate the effects of motor and power train inertia. Because of each clutch's location, the speed of its associated motor 45a, 45b, which is operably coupled to a shaft 70a, 70b and associated drum or drums 10, 11, 15, does not have to remain directly proportional to the drum speed during payout. Thus, the load control power transmission 20 allows fall control of the wire rope 4 for normal in-hauling and payout operations, while allowing rapid payout of wire rope 4 during surge or peak load situations, thereby reducing the risk of broken ropes.

In one embodiment, the clutches 65a, 65b are disk or axial type clutches. In one embodiment, the clutches 65a, 65b are rim type clutches with internal expanding shoes or external contracting shoes.

Figure 3:
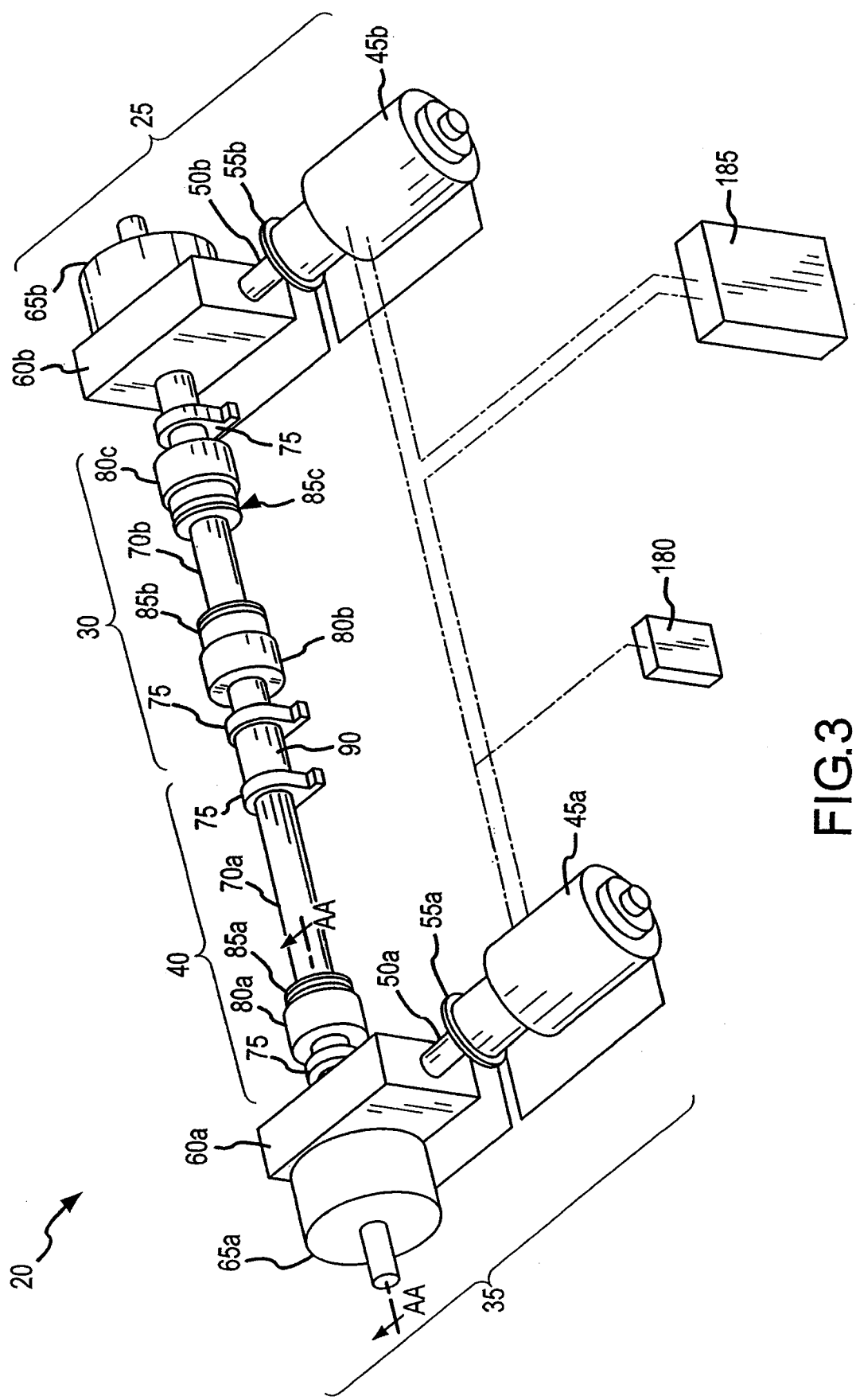
FIG. 3 is an isometric view of a load control power transmission as viewed from an elevated, port/stem position.

For a more detailed discussion of the load control power transmission 20, reference is now made to FIG. 3, which is an isometric view of the transmission 20 illustrated in FIG. 2, as viewed from the same elevated, port/stern position. As shown in FIG. 3, in one embodiment, the transmission 20 includes a starboard power assembly 25, a starboard drive shaft assembly 30, a port power assembly 35, and a port drive shaft assembly 40. The starboard power assembly 25 is operably coupled to the starboard drive shaft assembly 30. Similarly, the port power assembly 35 is operably coupled to the port drive shaft assembly 40.

As shown in FIG. 3, in one embodiment, the power assemblies 25, 35 each include an electric motor 45a, 45b, a power shaft 50a, 50b, a brake 55a, 55b, a primary gear reducer 60a, 60b, and a fluid cooled multi-disc clutch 65a, 65b. Each electric motor 45a, 45b drives a power shaft 50a, 50b that runs a primary gear reducer 60a, 60b coupled to a fluid cooled clutch 65a, 65b. Each fluid cooled clutch 65a, 65b, when engaged, transfers the power of its respective electric motor 45a, 45b to its respective drive shaft assembly 30, 40. As will be explained more fully later in this specification in the discussion of FIG. 4A, the less a clutch 65a, 65b is engaged, the greater the amount of slip between its power assembly 25, 35 and the respective drive shaft assembly 30, 40.

As stated above, one embodiment of the invention employs electric motors 45a, 45b to drive the winch drums 10, 11, 15. However, in other embodiments of the invention, the motors 45a, 45b are hydraulic motors or internal combustion engines.

As illustrated in FIG. 3, the drive shaft assemblies 30, 40 each include a drive shaft 70a, 70b supported by drive shaft support bearings 75. The port drive shaft 70a has a port tow drum drive pinion 80a and the starboard drive shaft has a starboard tow drum drive pinion 80b. In one embodiment, as shown in FIG. 3, the starboard drive shaft 70b has an anchor-handling drum drive pinion 80c. In another embodiment, the anchor-handling drum drive pinion 80c is located on the port drive shaft 70a. As shown in FIG. 3, each pinion 80a, 80b, 80c is paired with a jaw clutch 85a, 85b, 85c.

As can be understood from FIGS. 2 and 3, the port tow drum drive pinion 80a interfaces with, and drives, a drive gear on the port tow drum 10. When the port tow drum 10 is to be driven, the jaw clutch 85a engages the pinion 80a, causing the pinion 80a to rotate with the port drive shaft 70a, thereby driving the port tow drum 10. When the clutch 85a is disengaged from the pinion 80a, the port tow drum 10 is not driven because the port drive shaft 70a is free to rotate within the pinion 80a.

As can also be understood from FIGS. 2 and 3, the starboard tow drum drive pinion 80b interfaces with, and drives, a drive gear on the starboard tow drum 11. When the starboard tow drum 11 is to be driven, the jaw clutch 85b engages the pinion 80b, causing the pinion 80b to rotate with the starboard drive shaft 70b, thereby driving the starboard tow drum 11. When the clutch 85b is disengaged from the pinion 80b, the starboard tow drum 11 is not driven because the starboard drive shaft 70b is free to rotate within the pinion 80b.

As can further be understood from FIGS. 2 and 3, the anchor-handling drum drive pinion 80c interfaces with, and drives, a drive gear on the anchor-handling drum 15. When the anchor-handling drum 15 is to be driven, the jaw clutch 85c engages the pinion 80c, causing the pinion 80c to rotate with the starboard drive shaft 70b, thereby driving the anchor-handling drum 15. When the clutch 85c is disengaged from the pinion 80c, the anchor-handling tow drum 15 is not driven because the starboard drive shaft 70b is free to rotate within the pinion 80c.

As shown in FIG. 3, a center jaw clutch 90 resides between the opposed ends of the drive shafts 70a, 70b. When the center jaw clutch 90 is disengaged, the drive shafts 70a, 70b are independent of each other and free to rotate at different speeds and different directions, each drive shaft 70a, 70b being driven by its own power assembly 25, 35. Thus, for example, when the center clutch 90 is disengaged, the port power assembly 35 may drive the port drive shaft 70a in one direction to cause the port tow drum 10 to payout its wire rope 4, while the starboard power assembly 25 may drive the starboard drive shaft 70b in the opposite direction to cause the anchor-handling drum or the starboard tow drum to haul-in its corresponding wire rope 4.

As indicated in FIG. 3, when the center jaw clutch 90 is engaged, the drive shafts 70a, 70b essentially become one drive shaft. This allows the power of both power assemblies 25, 35 to be applied simultaneously to any one or more of the pinions 80a, 80b, 80c and its corresponding drum 10, 11, 15.

Figure 4A:
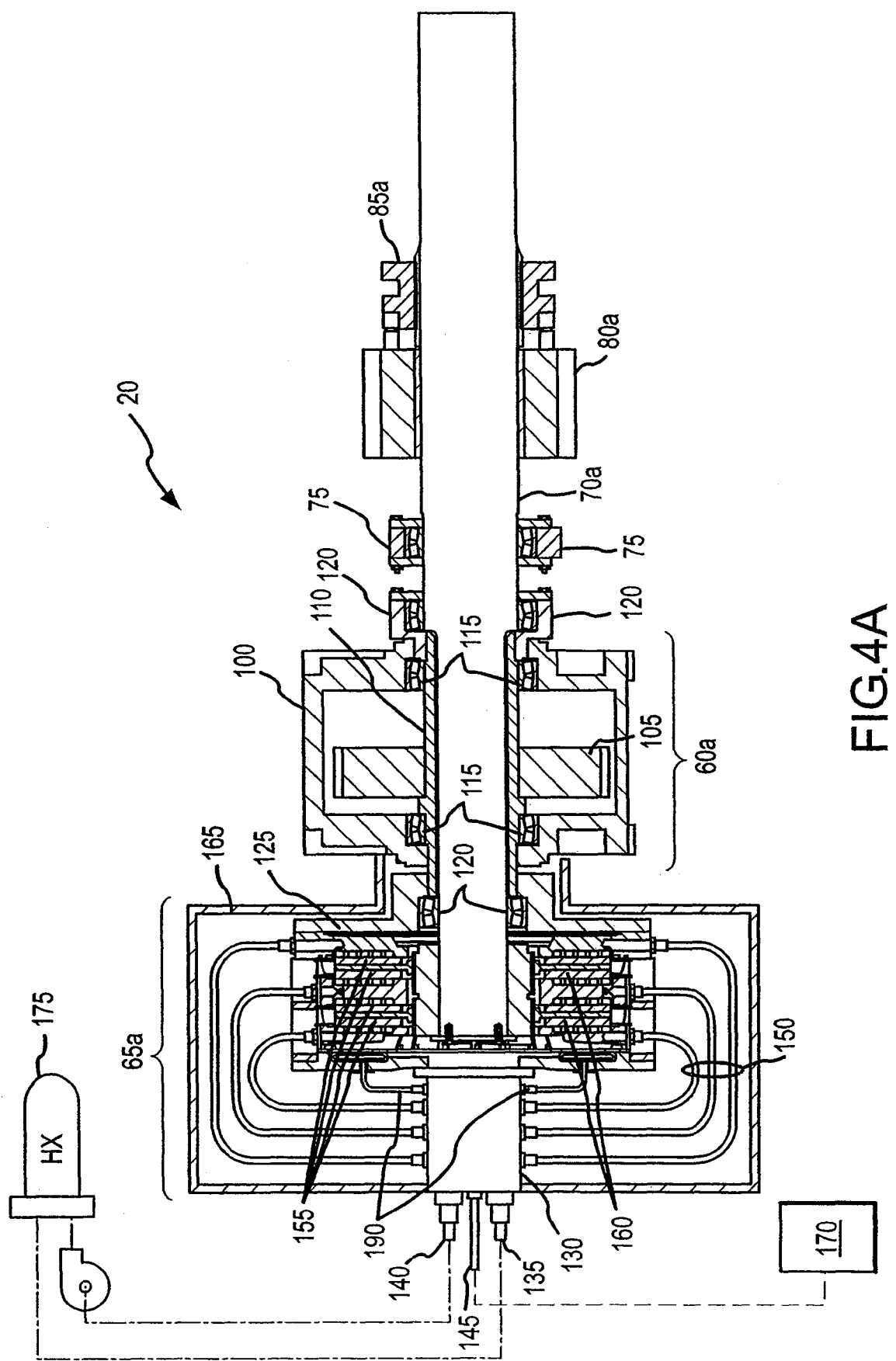
FIG. 4A is a sectional elevation along section line AA of FIG. 3 and through the port clutch, port gear reducer, and outer end of the port drive shaft.

As indicated in FIG. 3 and more fully shown in FIG. 4A, which is a sectional elevation along section line AA of FIG. 3 and through the port clutch 65a, port gear reducer 60a, and outer end of the port drive shaft 70a, the outer end portion of each drive shaft 70a, 70b passes through the primary gear reducer 60a, 60b and terminates within the clutch 65a, 65b. As shown in FIG. 4A, the primary gear reducer 60a includes a housing 100, a drive gear 105, a reducer output shaft 110, support bearings 115 for supporting the reducer output shaft 110 off of the housing 100, and support bearings 120 for supporting the reducer output shaft 110 off of the drive shaft 70a.

As indicated in FIG. 4A, the drive shaft 70a is supported by the support bearings 75 and is coaxially, rotatably displaceable within the reducer output shaft 110 when the clutch 65a is not fully engaged. The reducer output shaft 110 is rotatably displaceable within the housing 100 and supported by the support bearings 115, 120. The drive gear 105 is coaxially mounted on the reducer output shaft 110 and transmits the power from the electric motor 45a, via the power shaft 50a, to the reducer output shaft 110. As will be explained in greater detail later in this specification, the power is then transmitted from the reducer input shaft 110 to the drive shaft 70a to a greater or lesser degree, depending on the degree of clutch engagement.

As illustrated in FIG. 4A, in one embodiment, the clutch 65a includes a clutch housing 125, a swivel assembly 130, a coolant inlet 135, a coolant outlet 140, a main hydraulic or pneumatic control pressure line 145, coolant lines 150, and branch hydraulic or pneumatic control pressure lines 190. In one embodiment, where the each clutch 65a, 65b is a disk or axial type clutch, each clutch 65a, 65b will also include pressure plate friction surfaces 155 and clutch discs 160. In one embodiment, a clutch guard 165 encloses all of the aforementioned components of the clutches 65a, 65b, except the pressure line 145 and the coolant inlet 135 and outlet 140. The clutch housing 125 is secured to the reducer output shaft 110 and is coaxially, rotatably displaceable about the drive shaft 70a when the clutch 65a is not fully engaged. The swivel assembly 130 is secured to the clutch housing 125.

As indicated in FIG. 4A, the clutch housing 125 supports pressure plate friction surfaces 155 that are parallel to each other, extend radially inward from the clutch housing 125, and are secured to the clutch housing 125. The clutch discs 160 are mounted on the end portion of the drive shaft 70a, are parallel to each other, and radially extend outward from the shaft's outer circumference. Each clutch disc 160 is sandwiched between a pair of pressure plate friction surfaces 155. When the pressure plate friction surfaces 155 are hydraulically or pneumatically actuated by a hydraulic or pneumatic engagement system 170, they engage the clutch discs 160.

When the pressure plate friction surfaces 155 are less than fully engaged, the clutch discs 160 may rotatably displace relative to the friction surfaces 155, if a torque exerted on the drive shaft 70a exceeds the frictional force between the friction surfaces 155 and the clutch discs 160. The drive shaft 70a would then rotatably displace relative to the reducer output shaft 110.

Conversely, when the pressure plate friction surfaces 155 are fully engaged such that the torque exerted on the drive shaft 70a does not exceed the frictional force between the friction surfaces 155 and the clutch discs 160, the clutch discs 160 are prevented from rotatably displacing relative to the friction surfaces 155 and, as a result, the drive shaft 70a does not rotatably displace relative to the reducer output shaft 110. Consequently, the drive shaft 70a and the reducer output shaft 110 rotate together as one shaft.

As shown in FIG. 4A, the coolant inlet 135 and coolant outlet 140 are connected to the swivel assembly 130 to circulate coolant from the cooling system 175 through the clutch housing 125 via the coolant lines 150. The coolant absorbs and removes heat generated at the friction surfaces 155. In one embodiment, the fluid coolant is water. In other embodiments, the coolant will be oil, air or other types of fluids.

As illustrated in FIG. 4A, the hydraulic or pneumatic control pressure line 145 runs from the hydraulic or pneumatic actuation system 170 to a connection point on the swivel assembly 130, which is secured to the clutch housing 125. The branch hydraulic or pneumatic lines 190 are in fluid communication with the main hydraulic or pneumatic control pressure line 145 and run from the swivel assembly 130 to the clutch housing 125. The branch hydraulic or pneumatic lines 190 actuate the friction surfaces 155. Other actuation systems based on magnetic, mechanical or other actuation methods may also be used.

While FIG. 4A depicts one embodiment of the invention where the drive shaft 70a is coaxially positioned within the reducer output shaft 110, the friction surfaces 155 extend radially inward, and the clutch discs 160 extend radially outward, those skilled in the art will realize that other configurations of the invention may be developed without departing from the spirit of the invention.

Figure 4B:
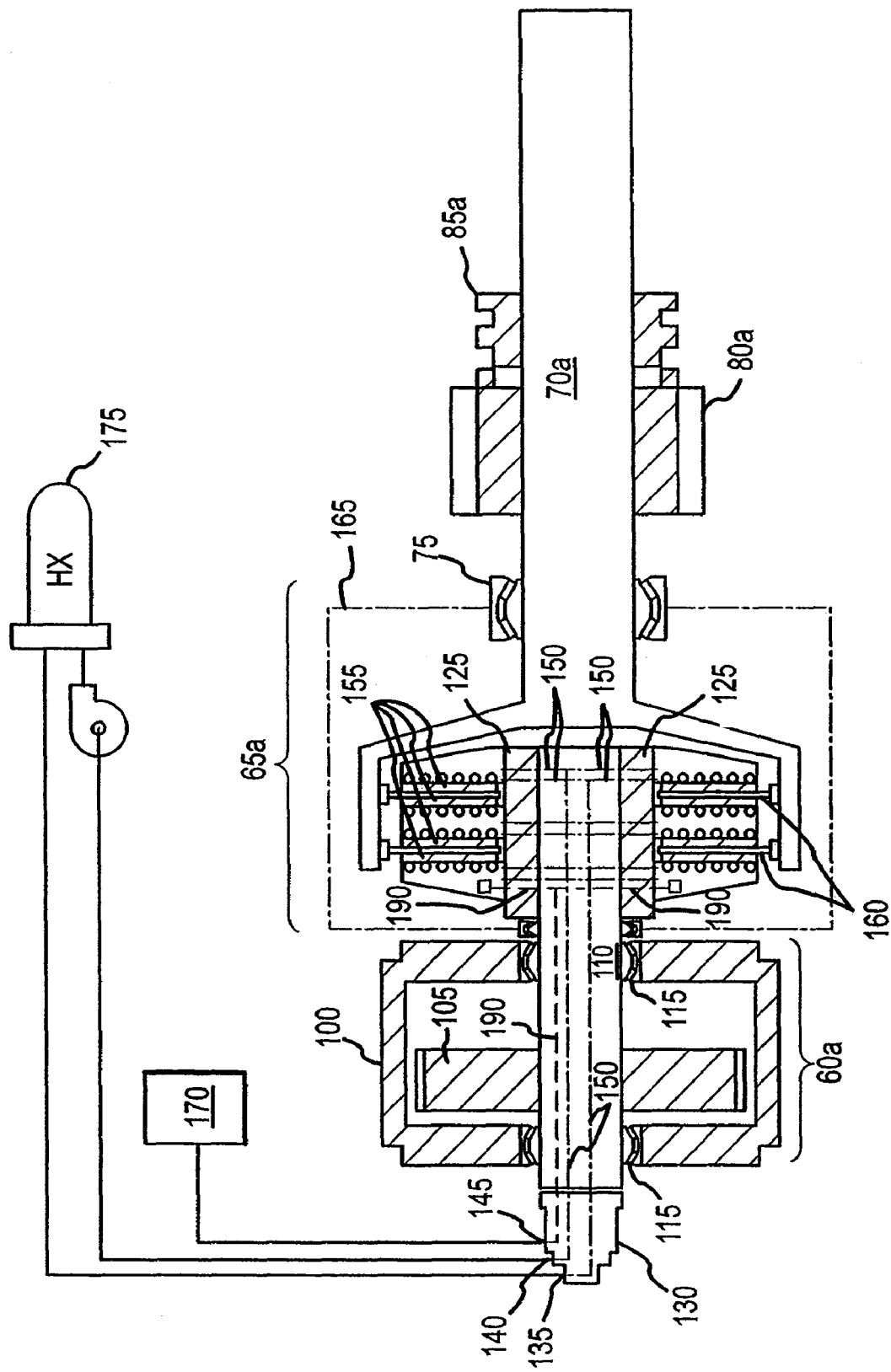
FIG. 4B is a sectional elevation similar to FIG. 4A, except of an alternative embodiment.

For example, as illustrated in FIG. 4B, which is a sectional elevation similar to FIG. 4A, except of an alternative embodiment, the port clutch 65a and the port gear reducer 60a have reversed positions and the drive shaft 70a is no longer coaxially within the reducer output shaft 110. Furthermore, the clutch discs 160 extend radially inward from the drive shaft 70a or, that is to say, an extension of the drive shaft 70a, and the friction surfaces 155 extend radially outward from the reducer output shaft 110, or in other words from a clutch housing 125 mounted on the output shaft 110.

As shown in FIG. 4B, the coolant inlet 135, coolant outlet 140, and main hydraulic or pneumatic control pressure line 145 connect to a swivel assembly 130 on the end of the output shaft 110. A branch hydraulic or pneumatic line 190 leads from the swivel assembly 130, through the output shaft 110, and to the friction surfaces 155. Coolant supply and return lines 150 run from the coolant inlet 135 and outlet 140, through the output shaft 110, and to the friction surfaces 155. Like the embodiment illustrated in FIG. 4A, the gear reducer 60a causes the output shaft 110 to rotate, which causes the drive shaft 70a to rotate to a greater or lesser degree, depending on the degree of clutch engagement.

Figure 4C:
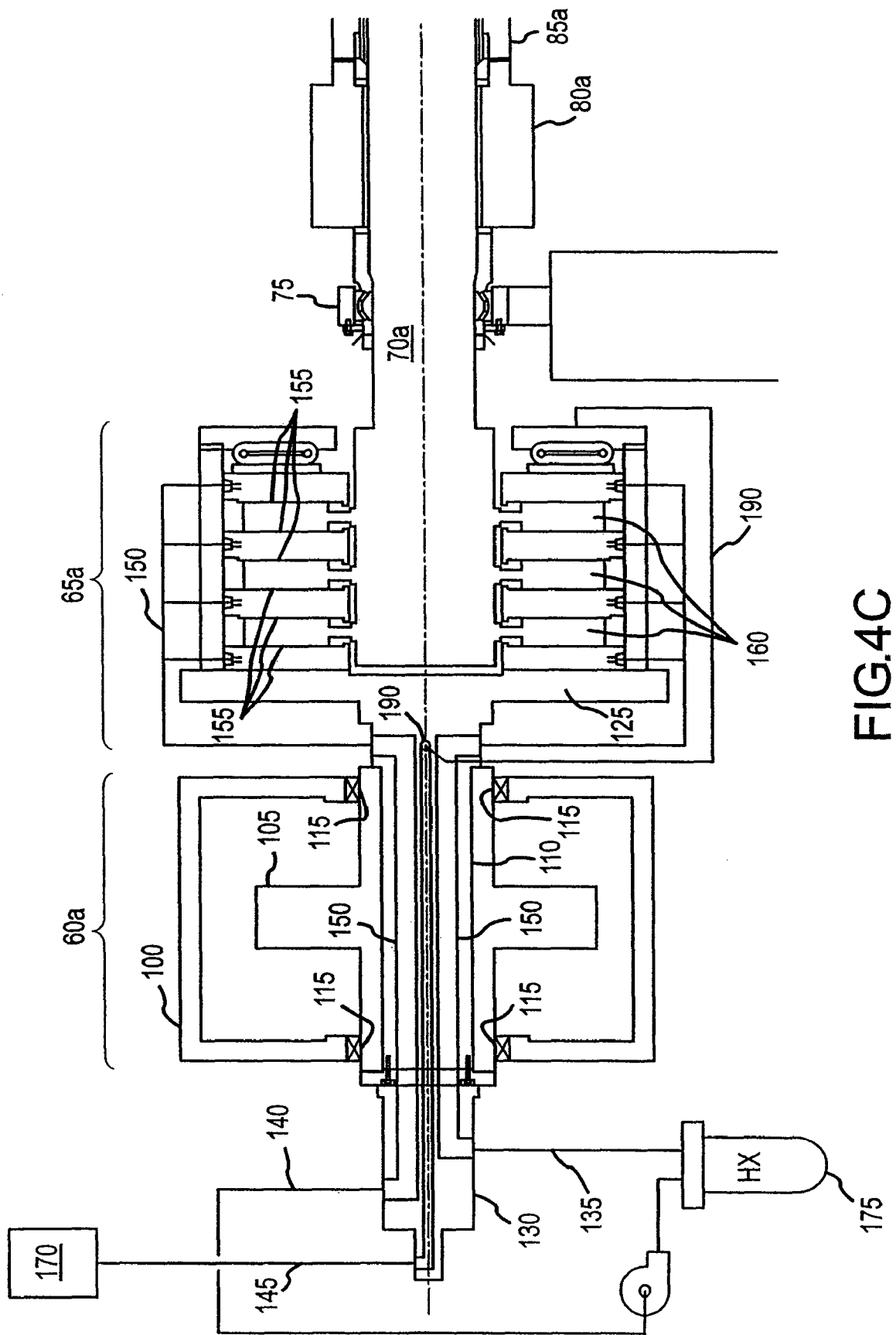
FIG. 4C is a sectional elevation similar to FIG. 4A, except of an alternative embodiment.

To illustrate another embodiment of the invention, reference is now made to FIG. 4C, which is a sectional elevation similar to FIG. 4A, except of an alternative embodiment, wherein the port clutch 65a and the port gear reducer 60a have reversed positions and the drive shaft 70a is no longer coaxially within the reducer output shaft 110. As shown in FIG. 4C, the clutch discs 160 extend radially outward from the drive shaft 70a, and the friction surfaces 155 extend radially inward from the clutch housing 125, which is attached to the end of the output shaft 110.

As illustrated in FIG. 4C, the coolant inlet 135, coolant outlet 140, and main hydraulic or pneumatic control pressure line 145 connect to a swivel assembly 130 on the end of the output shaft 110. A branch hydraulic or pneumatic line 190 leads from the swivel assembly 130, through the output shaft 110, and to the friction surfaces 155. Coolant supply and return lines 150 run from the coolant inlet 135 and outlet 140, through the output shaft 110, and to the friction surfaces 155. Like the embodiment illustrated in FIG. 4A, the gear reducer 60a causes the output shaft 110 to rotate, which causes the drive shaft 70a to rotate to a greater or lesser degree, depending on the degree of clutch engagement.

Figure 3A:
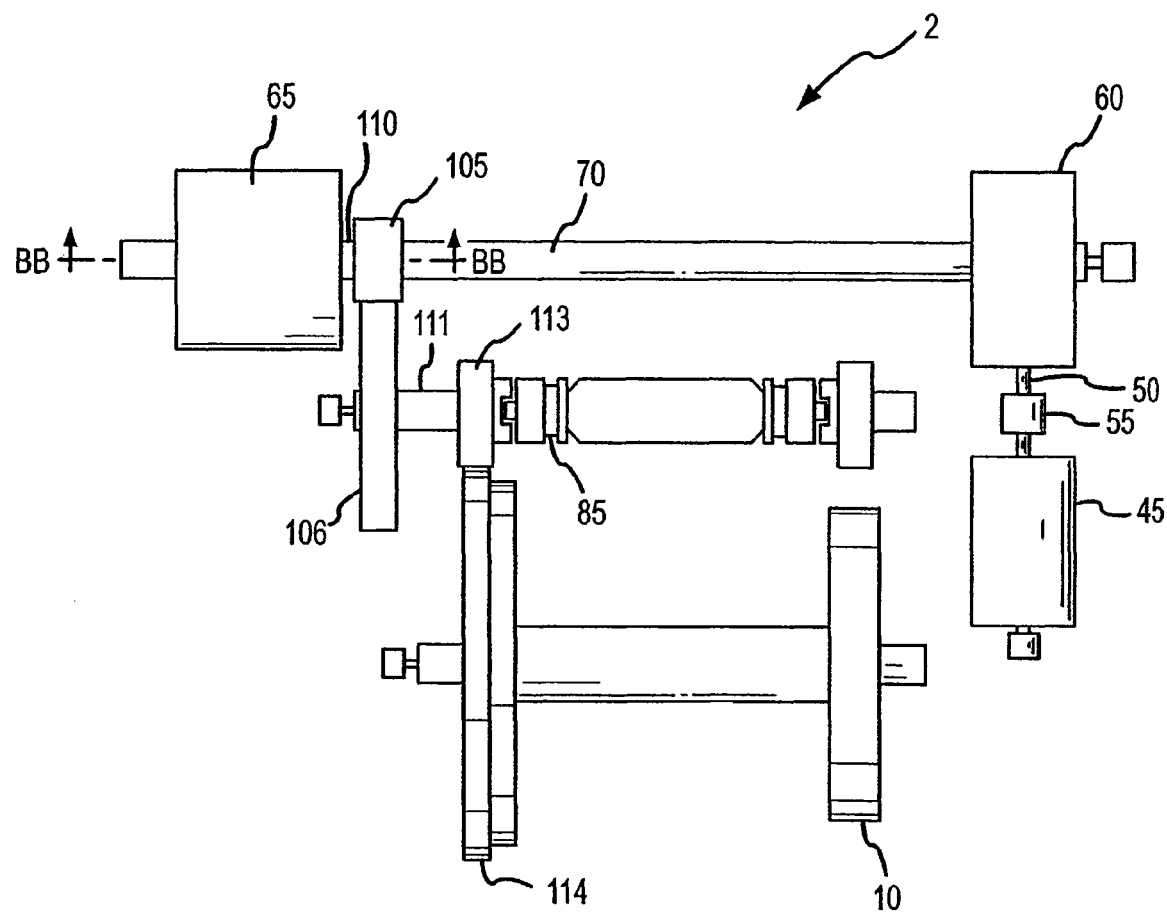
FIG. 3A is a schematic plan view of an alternative embodiment of the winching system.

To illustrate another embodiment of the winching system 2 of the subject invention, reference is now made to FIG. 3A, which is a schematic plan view of an alternative embodiment of the winching system 2. As shown in FIG. 3A, a power shaft 50 extends between a motor 45 and a gear box 60. A brake 55 is located along the power shaft 50. A first shaft 70 extends between the gear box 60 and a clutch 65.

Figure 4D:
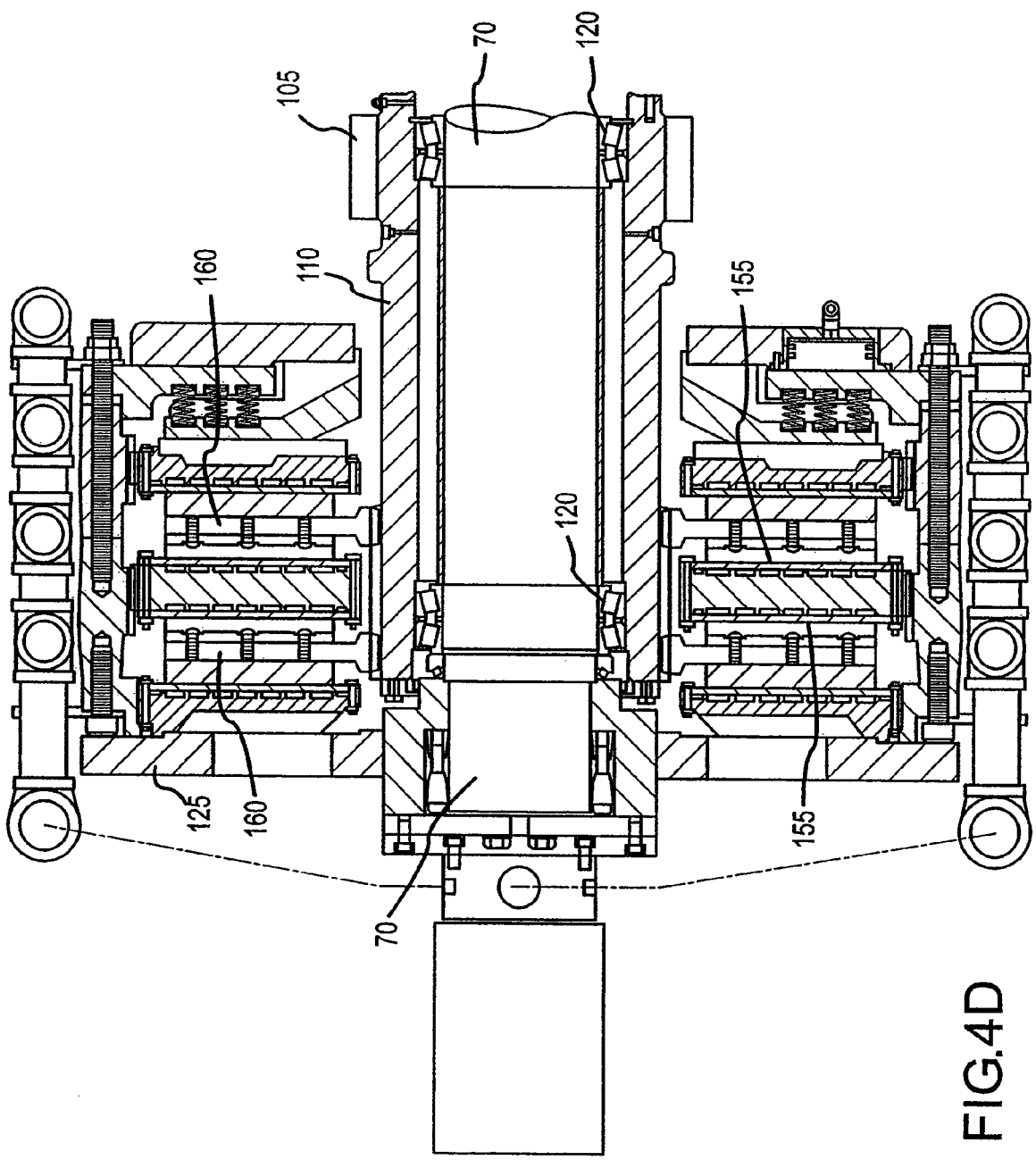
FIG. 4D is a sectional elevation along section line BB of FIG. 3A and through a clutch and outer end of a first shaft.

As shown in FIG. 4D, which is a sectional elevation taken along section line BB of FIG. 3A and through the clutch 65 and outer end of the first shaft 70, in extending into the clutch 65, the first shaft 70 is coaxially surrounded by a second shaft 110 and a first gear 105 mounted on the second shaft 110. In one embodiment, a clutch housing 125 radially extends from the second shaft 110. Pressure plate friction surfaces 155 are mounted on the clutch housing 125 and configured to engage clutch discs 160 that radially extend from the first shaft 70.

As can be understood from FIG. 3A, the first gear 105 drives a second gear 106, which is mounted on a third shaft 111. A fourth gear 113 is coaxially pivotally mounted on the third shaft 111 and in engagement with a drum gear 114 on the winch drum 10. The fourth gear 113 is brought into engagement with the third shaft 111 via a jaw clutch 85 arrangement as previously described in this Detailed Description. When the fourth gear 113 is engaged with the third shaft 111, it will drive a drum gear 114 and, as a result, the winch drum 10.

Figure 5:
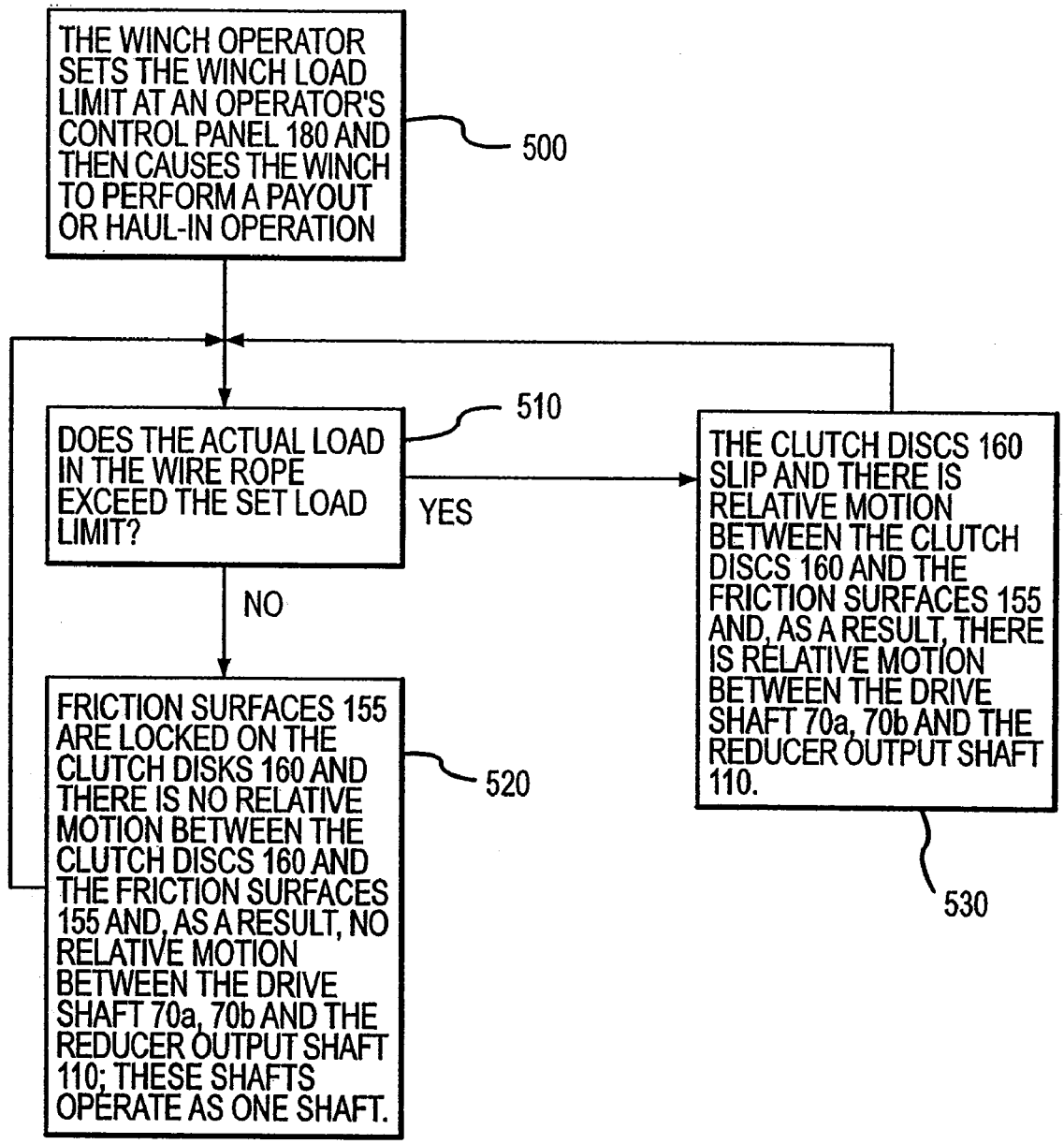
FIG. 5 is a flow diagram illustrating the function of the load control power transmission.

To discuss the function of the load control power transmission 20 and its components, reference is now made to FIGS. 3, 4A and 5. FIG. 5 is a flow diagram illustrating the function of the transmission 20. In operation, the winch operator sets the winch load limit at an operator's control panel 180 (block 500). In other words, the operator sets the clutch 65a, 65b such that the clutch discs 160 will not rotatably displace relative to the friction surfaces 155, unless the torque imposed on the clutch 65a, 65b by the load in the wire rope 4 exceeds the frictional force between the friction surfaces 155 and the clutch discs 160. In one embodiment, the winch load limit will be based on a percentage of the structural load limit of the winch or a component of the winch (e.g., the structural load limit of the wire rope).

The operator then causes the winch to perform a payout or haul-in operation or causes the winch to hold a load in place. If the actual load in the wire rope 4 does not exceed the set load limit (block 510), then there is no relative motion between the clutch discs 160 and the friction surfaces 155 (block 520). As a result, there is no relative motion between the drive shaft 70a, 70b and the reducer output shaft 110, and these shafts operate as one shaft (block 520).

If the actual load in the wire rope exceeds the set load limit (block 510), then there is relative motion between the clutch discs 160 and the friction surfaces 155, because the clutch discs 160 slip (block 530). Consequently, there is relative motion between the drive shaft 70a, 70b and the reducer output shaft 110 (block 520). This situation may arise, for example, during a payout or haul-in procedure when a large wave causes the vessel 1 to surge upwards, suddenly decreasing the slack in the wire rope and causing the wire rope load to peak. Once the actual load in the wire rope returns below the set load limit (block 510) (e.g., the vessel 1 rides down the wave and the slack in the wire rope increases), the friction surfaces 155 relock on the clutch discs 160 and the relative motion between the drive shaft 70a, 70b and the reducer output shaft 110 ceases (i.e., the these shafts again operate as one shaft) (block 520).

The load control power transmission 20 facilitates dynamic, high speed/high horsepower wire rope payout by providing two modes for dissipating the energy generated during the dynamic payout process. In the first mode, during a dynamic payout, the load control power transmission 20 generates energy via a motor 45a, 45b and the energy is dissipated at an energy dissipation system 185 connected to the motor 45a, 45b. For example, in one embodiment, the energy is generated at an electric motor 45a, 45b and the energy is dissipated at an electrical load, such as a resistor bank 185, electrically connected to the electrical motor 45a, 45b. In the second mode, during a dynamic payout, the load control power transmission 20 generates energy via both an electric motor 45a, 45b and a clutch 65a, 65b, and the energy is dissipated via the resistor bank 185 coupled to the motor 45a, 45b and a cooling system 180 coupled to the clutch 65a, 65b.

As explained above, in one embodiment of the first mode, the dynamic payout energy may be dissipated at an electrical load (e.g., resistor bank 185) coupled to an electric motor 45a, 45b. However, in another embodiment of the first load, wherein the electrical motor 45a, 45b and the electrical load 185 are replaced with a hydraulic motor coupled to a hydraulic system, the dynamic payout energy is dissipated via the hydraulic system. In either case, in the second mode, the energy generation/dissipation method of the first mode (i.e., the electric motor/electrical load combination or the hydraulic motor/hydraulic system combination) is combined with the energy generation/dissipation capability of the fluid cooled clutch 65a, 65b coupled to the cooling system 180.

Figure 6:
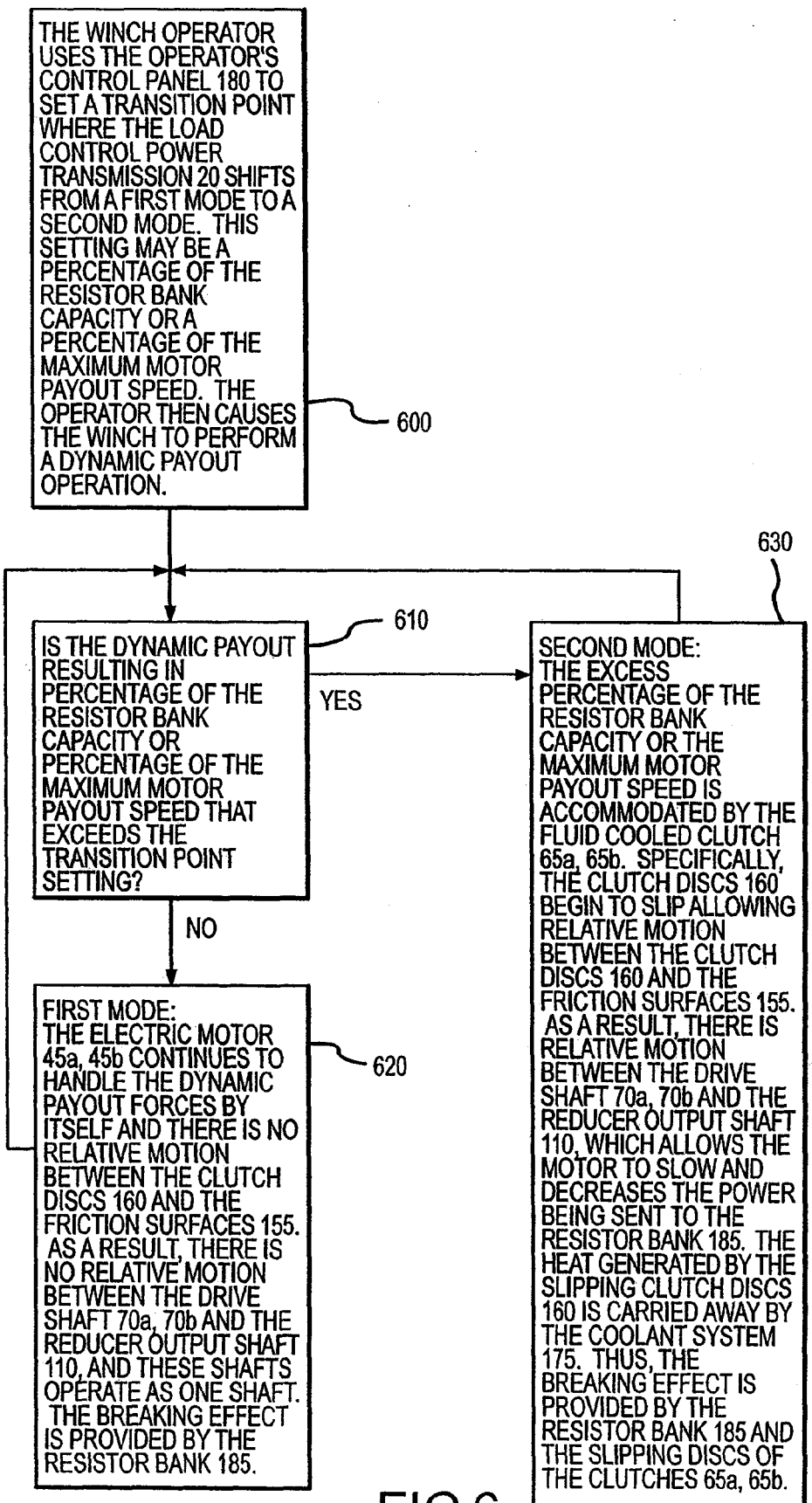
FIG. 6 is a flow diagram illustrating a dynamic payout process employing the load control power transmission.

FIG. 6 is a flow diagram illustrating the dynamic payout process. In operation, the winch operator uses the operator's control panel 180 to set a transition point wherein the load control power transmission 20 shifts from the first mode to the second mode (block 600). In other words, the transition point determines when the energy generation/dissipation responsibilities shifts from being, generally speaking, the responsibility of the primary energy generation/dissipation system (i.e., the electric motor/resistor bank combination) to being shared between the primary energy generation/dissipation system and the supplemental energy generation/dissipation system (i.e., the clutch/cooling system combination).

In one embodiment, the transition point may be based on a percentage of the resistor bank capacity. For example, in one embodiment, the setting is 66% of the maximum resistor bank dissipation capacity.

In one embodiment, the transition point may be based on a predetermined electric motor speed, winch drum speed, and/or torque perceived by the motor. For example, in one embodiment, the predetermined electric motor speed and/or torque may be based on a percentage of the maximum payout motor speed and/or torque.

Once the transition point has been set (block 600), the operator causes the winch to perform a dynamic payout operation. If the power generated by the electric motor 45a, 45b does not exceed the setting (e.g., 66% of the maximum resistor bank dissipation capacity or a predetermined payout motor speed) (block 610), then the electric motor 45a, 45b continues to handle the dynamic payout forces by itself (i.e., the electric motor/resistor bank combination is, generally speaking, responsible for the generation and dissipation of all the dynamic payout energy) and there is no relative motion between the clutch discs 160 and the friction surfaces 155 (block 620). As a result, there is no relative motion between the drive shaft 70a, 70b and the reducer output shaft 110, and these shafts operate as one shaft (block 620). Thus, when the load control power transmission 20 is operating in the first mode during a dynamic payout, the speed of the winch drum is controlled by the braking effect of the motor 45a, 45b and associated electrical load (e.g., resistor bank 185).

If the power regenerated by the electric motor 45a, 45b exceeds the setting (e.g., 66% of the maximum resistor bank regeneration dissipation capacity or a predetermined payout motor speed and/or torque) (block 610), then the load control power transmission 20 transitions to the second mode and the excess percentage of the resistor bank capacity or the motor speed and/or torque is accommodated by the fluid cooled clutch 65a, 65b (block 630). Specifically, the clutch discs 160 begin to slip allowing relative motion between the clutch discs 160 and the friction surfaces 155 (block 630). As a result, there is relative motion between the drive shaft 70a, 70b and the reducer output shaft 110, which, in one embodiment, allows the motor 45a, 45b to slow and decreases the power being sent to the resistor bank 185 (block 630). In another embodiment, relative motion between the drive shaft 70a, 70b and the output shaft 110 at least prevents the motor speed and/or the power being sent to the resistor bank from increasing further.

The heat generated by the slipping clutch discs 160 is carried away by the cooling system 175 (block 630). Thus, when the load control power transmission 20 is operating in the second mode during a dynamic payout, the speed of the winch drum is controlled by the braking effects of the motor 45a, 45b and associated electrical load (e.g., resistor bank 185) and the slipping discs 160 of the fluid cooled clutch 65a, 65b. Also, in the second mode, the relative motion between the shafts 70, 110 allows the speed of the payout to be maintained, although the electric motor 45a, 45b has been allowed to slow or at least the motor's speed and/or torque has not continued to increase.

Once the power to be dissipated during the dynamic payout process decreases to a level that does not exceed the setting (block 610), the friction surfaces 155 fully engage the clutch discs 160 to stop the relative motion between these aspects of the clutch 65a, 65b (block 620). At the same time, the electric motor 45a, 45b, if necessary, speeds up to match the payout speed, and the resistor bank 185 again, generally speaking, becomes responsible for dissipating all of the power being generated by the dynamic payout (block 620).

In one embodiment, the dynamic payout power being generated by the electric motor 45a, 45b and sent to the resistor bank 185 is monitored via power sensor means as are known in the art. As the power increases, additional resistors are brought on line (i.e., the electrical load is increased incrementally). Once, the transition point (i.e., a percentage of the electrical load capacity) has been reached, the clutch 65a, 65b is progressively released and relative rotational displacement between the drive shaft 70a, 70b and the output shaft 110 progressively increases. As the dynamic payout process continues, the power being sent to the electrical load 185 is continuously monitored and the clutch will be adjusted accordingly.

In one embodiment while the system is operating in the second mode, if the power to the electrical load begins to decrease, the power sensors will determine this as an indication that the overall dynamic payout power is decreasing. Consequently, the clutch 65a, 65b will be actuated to progressively decrease the rotational displacement between the drive and output shafts. If the monitoring system determines that the overall dynamic payout power has decreased to a point that does not exceed the transition point, then the system will begin to transition to the first mode by progressively actuating the clutch to progressively increase the torque perceived by the electrical motor until the system is fully operating in the first mode.

As explained above, in one embodiment, as the energy generated during the dynamic payout process causes the set percentage of maximum motor speed or electrical load capacity to be exceeded, the clutch 65a, 65b begins to slip and the cooling system 175 begins to assume responsibility for at least a portion of the necessary energy dissipation. In other words, the energy dissipation responsibilities transitions from being, generally speaking, the responsibility of the electrical motor 45a, 45b and its associated electrical load 185, to being at least partially shared with the clutch 65a, 65b and the cooling system 175.

However, the responsibilities and sequencing may be reversed. For example, the energy dissipation responsibilities could initially be, generally speaking, the responsibility of the clutch 65a, 65b and the cooling system 175. When a set point associated with the clutch (e.g., a percentage of the maximum clutch speed or a percentage of the maximum cooling capacity of the cooling system) is exceeded, the electrical motor 45a, 45b and its associated electrical load 185 begin to assume at least partial responsibility for energy dissipation.

In the event of an emergency stop or drum over-speed condition, the fluid cooled clutch 65a, 65b is fully applied, along with the drum brakes and the electric motor brakes 55a, 55b, in a controlled sequence. This provides maximum stopping power to the winch.

Although the present invention has been described with reference to preferred embodiments, persons skilled in the art will recognize that changes may be made in form and detail without departing from the spirit and scope of the invention.

We claim:

1. A method of dissipating energy from a winch, the winch carrying a load on a line, the method comprising:
    setting a transition point wherein the responsibility for dissipating the energy from the winch transitions from being generally the responsibility of a primary energy dissipation system to being shared between the primary energy dissipation system and a supplemental energy dissipation system;
    dissipating the energy through the primary system when the transition point has not been exceeded; and
    dissipating the energy through the primary and supplemental systems when the transition point has been exceeded.

2. The method of claim 1, wherein the transition point comprises a percentage of a capacity of the primary energy dissipation system.

3. The method of claim 1, wherein the transition point comprises a percentage of a motor speed.

4. The method of claim 1, wherein the transition point comprises a maximum torque on the winch.

5. The method of claim 1, further comprising controllably paying out the load at high speed.

6. The method of claim 1, further comprising converting the energy from the winch with a motor connected to the winch, the conversion creating converted energy.

7. The method of claim 6, wherein the converted energy is electrical energy and dissipating the energy through the primary system includes dissipating the electrical energy with a bank of resistors.

8. The method of claim 6, wherein the converted energy is hydraulic energy and dissipating the energy through the primary system includes dissipating the hydraulic energy with a hydraulic dissipation system.

9. The method of claim 6, further comprising selectively converting the energy from the winch with a clutch connected to the winch to create heat energy.

10. The method of claim 9, wherein dissipating the energy through the supplemental system includes dissipating the heat energy from the clutch with a cooling system.

11. The method of claim 9, wherein selectively converting the energy with a clutch comprises selectively allowing the clutch to slip.

12. The method of claim 11, wherein selectively allowing the clutch to slip comprises:
    monitoring the transition point;
    maintaining engagement of the clutch when the transition point is not exceeded; and
    allowing the clutch to slip when the transition point is exceeded.

13. The method of claim 11, wherein selectively allowing the clutch to slip is a pneumatic process.

14. The method of claim 11, wherein selectively allowing the clutch to slip is a hydraulic process.

* * * * *

UNITED STATES PATENT AND TRADEMARK OFFICE
CERTIFICATE OF CORRECTION

| | | |
|---|---|---|
| PATENT NO. | : 7,900,894 B2 | Page 1 of 1 |
| APPLICATION NO. | : 12/358922 | |
| DATED | : March 8, 2011 | |
| INVENTOR(S) | : Copp et al. | |

It is certified that error appears in the above-identified patent and that said Letters Patent is hereby corrected as shown below:

SPECIFICATION

| Column | Line | PTO | Should Read |
|---|---|---|---|
| 3 | 15 | "port/stem position" | -- port/stern position -- |
| 3 | 17 | "port/stem position" | -- port/stern position -- |
| 3 | 42 | "the stem 5" | -- the stern 5 -- |

Signed and Sealed this

Thirty-first Day of May, 2011

David J. Kappos
*Director of the United States Patent and Trademark Office*